US009743683B2

(12) United States Patent
Bramoulle et al.

(10) Patent No.: US 9,743,683 B2
(45) Date of Patent: Aug. 29, 2017

(54) METHOD FOR PRODUCING HIGHLY PALATABLE DRY CAT FOOD

(75) Inventors: Loïc Bramoulle, Sarzeau (FR); Isabelle Guiller, Le Tour du Parc (FR); Julien Ruaud, Pleucadeuc (FR)

(73) Assignee: SPECIALITES PET FOOD, Elven (FR)

( * ) Notice: Subject to any disclaimer, the term of this patent is extended or adjusted under 35 U.S.C. 154(b) by 870 days.

(21) Appl. No.: 13/378,856

(22) PCT Filed: Jun. 15, 2010

(86) PCT No.: PCT/EP2010/058405
§ 371 (c)(1),
(2), (4) Date: Dec. 16, 2011

(87) PCT Pub. No.: WO2010/146060
PCT Pub. Date: Dec. 23, 2010

(65) Prior Publication Data
US 2012/0093986 A1   Apr. 19, 2012

Related U.S. Application Data

(60) Provisional application No. 61/218,765, filed on Jun. 19, 2009.

(30) Foreign Application Priority Data

Jun. 19, 2009  (EP) ..................................... 09305580

(51) Int. Cl.
| A23K 1/18 | (2006.01) |
| A23K 50/42 | (2016.01) |
| A23K 20/147 | (2016.01) |
| A23K 20/158 | (2016.01) |
| A23K 20/163 | (2016.01) |
| A23K 20/28 | (2016.01) |

(52) U.S. Cl.
CPC ............ A23K 50/42 (2016.05); A23K 20/147 (2016.05); A23K 20/158 (2016.05); A23K 20/163 (2016.05); A23K 20/28 (2016.05); A23V 2002/00 (2013.01)

(58) Field of Classification Search
CPC .... A23K 1/1631; A23K 1/164; A23K 1/1756; A23K 1/1643; A23K 1/1853; A23K 20/147; A23K 20/163; A23K 50/42; A23K 20/28; A23K 20/158; A23V 2002/00; A23V 2200/16; A23V 2250/507; A23V 2250/548; A23V 2250/638; A23V 2250/5425; A23V 2250/5066; A23V 2250/1638
USPC .................. 426/302, 650, 531, 442, 56, 805
See application file for complete search history.

(56) References Cited

U.S. PATENT DOCUMENTS

| 4,169,162 A * | 9/1979 | Appleman ........... A23K 1/1866 426/335 |
| 4,400,405 A * | 8/1983 | Morley ................... A23C 9/137 426/565 |
| 4,543,247 A * | 9/1985 | von Bittera ............ A01N 25/34 119/654 |
| 4,702,924 A | 10/1987 | Owens et al. |
| 6,025,004 A * | 2/2000 | Speck et al. .................. 426/516 |
| 6,045,834 A * | 4/2000 | Howes et al. .................... 426/2 |
| 6,228,418 B1 | 5/2001 | Gluck et al. |
| 2001/0002272 A1* | 5/2001 | Brunner .................. A23K 1/004 426/656 |
| 2003/0045708 A1* | 3/2003 | Magallanes ......... C08B 37/0087 536/123 |
| 2003/0228409 A1 | 12/2003 | Fritz-Jung et al. |
| 2004/0076718 A1 | 4/2004 | Parthasarathy |
| 2005/0084563 A1* | 4/2005 | Cupp et al. ....................... 426/2 |
| 2006/0292288 A1* | 12/2006 | Russell Maynard ......... 426/658 |
| 2007/0202211 A1* | 8/2007 | Altom .................... A23K 40/20 426/2 |
| 2007/0292594 A1 | 12/2007 | Levin |
| 2008/0206401 A1* | 8/2008 | Parthasarathy .................. 426/28 |
| 2008/0280274 A1* | 11/2008 | Friesen .................. A23K 10/26 434/219 |
| 2008/0311226 A1* | 12/2008 | Yamka et al. ................. 424/684 |

(Continued)

FOREIGN PATENT DOCUMENTS

| CN | 103407205 A | * 11/2013 |
| FR | 2913601 A1 | * 9/2008 |

(Continued)

OTHER PUBLICATIONS

Talcott, Patricia. "Moldy food and mycotoxins potential problems for pets", 2 pages, dated Oct. 1, 2008, downloaded from http://veterinarycalendar.dvm360.com/moldy-food-and-mycotoxins-potential-problems-pets.*

"Increasing the palatability of pet food" (downloaded from internet archives for www.petscorner.com.my/articles/article-increasing_palatab.html, dated Apr. 16, 2004, 5 pages.*

"Mycotoxin adsorbents and binders" (downloaded from http://www.knowmycotoxins.com/ndairy15.htm, 4 pages, dated Jul. 17, 2007.*

(Continued)

Primary Examiner — Chhaya Sayala
(74) Attorney, Agent, or Firm — Birch, Stewart, Kolasch & Birch, LLP

(57) ABSTRACT

The present invention relates to a method for producing highly palatable dry cat foods, by providing dry cat food preparations having specific compositions and/or texture properties, and by adding thereto palatability enhancers, so as to obtain highly palatable dry cat foods. Preferably, the present invention provides highly palatable dry cat foods having a rigidity below or equal to about 100 N/mm. Also is the present invention related to a method for increasing the palatability effect of a liquid palatability enhancer for use in dry cat food preparation, and to kits useful for enhancing palatability of dry cat foods.

2 Claims, 4 Drawing Sheets

(56) References Cited

U.S. PATENT DOCUMENTS

| | | | |
|---|---|---|---|
| 2009/0017130 A1* | 1/2009 | Yamka et al. | 424/601 |
| 2009/0148589 A1 | 6/2009 | Fox et al. | |
| 2009/0297663 A1* | 12/2009 | Van Geel-Schutten | A21D 10/00 426/61 |

FOREIGN PATENT DOCUMENTS

| | | | |
|---|---|---|---|
| JP | 2004-49178 A | | 2/2004 |
| SE | 8903969 A | * | 5/1991 |
| WO | WO 0207875 A1 | * | 1/2002 |
| WO | WO 2006/009354 A1 | | 1/2006 |
| WO | WO 2006/122196 A2 | | 11/2006 |
| WO | WO 2007/149962 A1 | | 12/2007 |

OTHER PUBLICATIONS

Yeomans, Proc.Nutr. Soc. (1998), vol. 57, pp. 609-615 "Palatability—More than a Matter of Taste", downloaded from http://extension.usu.edu/files/publications/factsheet/I 3 I .pdf, dated Mar. 1, 2003, 3 pages.*

Holly Nash, "Dog Food Standards by the AAFCO" , downloaded from internet archives for www.peteducation.com, dated Feb. 27, 2010, 4 pages.*

"Dog Food Can Not be Complete and Balanced" for all Dogs, downloaded from www.wdcusick.com/01.html dated Feb. 2001, 7 pages.*

"AAFCO Statements explained—Iams", dated Feb. 1001, 4 pages.*

Dzanis, J. Nutr., 124: 2535S-2539S, 1994.*

"Pet Food and Treat" downloaded from internet archives for http://www.ublcorp.com/petfood.html, 14 pages, particularly pp. 1-3, dated Mar. 5, 2005.*

Anton et al., "Instrumental Texture Evaluation of Extruded Snack Foods: A Review," Cienc. Tecnol. Aliment., vol. 5, No. 4, 2007, pp. 245-251.

Ravi et al., "Texture Evaluation by Uniaxial Compression of Some Snack Foods," Journal of Texture Studies, vol. 38, 2007 (received for publication Mar. 4, 2005; accepted for publication Aug. 25, 2006), pp. 135-152.

International Search Report for PCT/EP2010/058405 dated Jul. 29, 2010.

* cited by examiner

METHOD FOR PRODUCING HIGHLY PALATABLE DRY CAT FOOD

CROSS REFERENCE TO RELATED APPLICATIONS

This application is the National Phase of PCT/EP2010/058405 filed on Jun. 15, 2010, which claims priority under 35 U.S.C. 119(e) to U.S. Provisional Application No. 61/218,765, filed on Jun. 19, 2009 and under 35 U.S.C. 119(a) to Patent Application No. 09305580.4 filed in Europe on Jun. 19, 2009, all of which are expressly incorporated by reference into the present application.

BACKGROUND OF THE INVENTION

The present invention relates to a method for producing highly palatable dry cat foods, by providing dry cat food preparations having specific compositions and/or texture properties, and by adding thereto palatability enhancers, so as to obtain said highly palatable dry cat foods. Preferably, the present invention provides highly palatable dry cat foods having a rigidity below or equal to about 100 N/mm.

The present invention relates to complete and balanced dry foods for cats.

Pets are well taken care of by their owners who provide them a proper selection of foods. Those foods include not only their usual diet, but also any supplements, treats, and toys. When designing foods for pets such as dogs and cats, optimal health and wellness are important goals. Nevertheless, the most nutritious pet food is of little value if the animals reject or refuse to eat the food, or if the pet's consumption of food is restricted because the pet finds the food unpalatable. Pets, like humans, are attracted to and eat more regularly and easily foods which they find palatable. In this respect, cats especially are very sensitive to food palatability, so that their feeding behaviour has often been referred to as "finicky". Therefore, palatability is an extremely important criterion for pet consumption, and there is a continuous need for increasing palatability of pet food, especially of cat food.

Animal foods (or pet foods) typically contain flavour compositions to increase the palatability thereof, and to make them appealing or appetizing to pets. It is known that palatability of dry pet food may be enhanced by some palatable components. As an example, in U.S. Pat. No. 5,186,964, Gierhart discloses a palatability composition comprising sodium acid pyrophosphate to improve cat food palatability. Another example is described in U.S. Pat. No. 5,690,988 patent, wherein palatability of the cat food is increased by adding a choline compound.

Continuing efforts are made to provide pet foods with improved palatability. And, adding flavours is not the only solution to increase pet food palatability. For example, US patent application No. 2008/057152 describes a method of ensuring acceptance of a cat food by providing specific macronutrient content parameters. It thus appears that there are different ways to enhance cat food palatability, resulting in more or less satisfying levels of food consumption by cats.

As a consequence, there is a continuing need for improving pet food palatability, especially cat food palatability, and it is of high interest to find palatability-improving conditions that are acceptable for the manufacturers, e.g., at moderate costs.

SUMMARY OF THE INVENTION

An object of the present invention relates to a method for producing a palatable dry cat food, comprising at least:

a) producing a dry cat food preparation having a rigidity below or equal to about 100 N/mm;
b) adding at least one palatability enhancer to said dry cat food preparation; and
c) obtaining a palatable dry cat food, wherein said palatable dry cat food has a rigidity below or equal to about 100 N/mm.

Preferably, said dry cat food preparation comprises at least one ingredient selected from:
phyllosilicates,
glucomannans and functional equivalents thereof,
water-binding proteinaceous materials containing at least 65% proteins, and
combinations thereof.

Another object of the present invention is a method for producing a palatable dry cat food, comprising at least:

a) producing a dry cat food preparation comprising at least one ingredient selected from:
phyllosilicates,
glucomannans and functional equivalents thereof,
water-binding proteinaceous materials containing at least about 65% proteins, and
combinations thereof;
b) adding at least one palatability enhancer to said dry cat food preparation; and
c) obtaining a palatable dry cat food.

Preferably, said palatable dry cat food has a rigidity below or equal to about 100 N/mm Also, preferably, in step a) above, said dry cat food preparation is extruded prior to drying. Another object of the present invention concerns a palatable dry cat food obtainable by the foregoing method.

Yet another object of the present invention relates to the use of at least one ingredient as mentioned above for preparing a palatable dry cat food preferably having a rigidity below or equal to about 100 N/mm.

It is still an object of the present invention to provide a method for increasing the palatability effect of a liquid palatability enhancer intended to be added to a dry cat food, comprising at least:

a) providing a dry cat food or a dry cat food preparation, wherein said dry cat food or said dry cat food preparation preferably has a rigidity below or equal to about 100 N/mm;
b) adding said liquid palatability enhancer to said dry cat food or said dry cat food preparation; and
c) obtaining a palatable dry cat food, wherein the palatability effect of said liquid palatability enhancer is increased.

The present invention further relates to palatability-enhancing kits for producing palatable dry cat foods preferably having a rigidity below or equal to about 100 N/mm.

DETAILED DESCRIPTION OF THE INVENTION

Definitions

Figure 1:
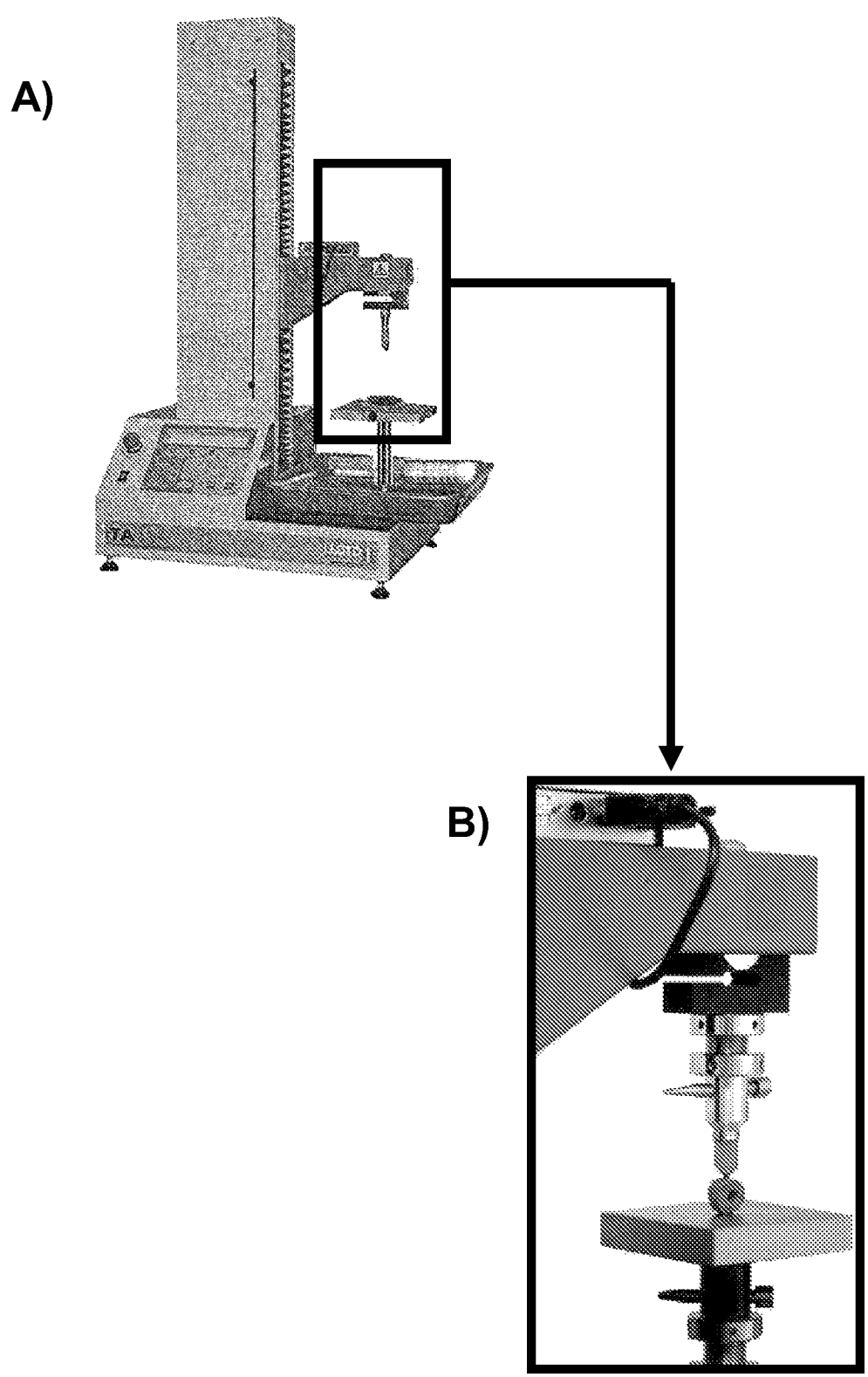
FIG. 1: Photographs of a Lloyd TA Plus Texture Analyzer, as an appropriate device for measuring texture properties of a pet food. A: TA Plus Texture Analyzer. B: Load cell and probe details of the device.

All references herein to "food" or "foodstuff" are intended to only refer to a dry food that is manufactured and sold for cat consumption. In the present context, the terms "pet food for cats", "pet food", "cat food", "dry cat food", and "dry pet food" are interchangeably used to refer to all types of balanced and complete dry foods for cats.

The terms "balanced (and) complete pet food" herein refer to a nutritionally adequate feed for companion animals having all nutrients in the proper amount and proportion for sustaining life without additional food. The balanced complete petfood can thus be fed as a sole ration. In other words, a balanced complete pet food excludes chews, treats, and the like.

The pet foods available on the market may be classified in three groups based upon their moisture content:
- canned or wet or high-moisture foods (generally, of at least 50% moisture), which typically are the most palatable to the pets;
- dry or low-moisture foods (generally, containing less than 15% moisture), which typically have high nutritional content, least expensive packaging, greatest convenience, but are less palatable; and
- semi-moist or semi-dry or soft dry or intermediate or medium-moisture foods (typically with about 15 to 50% moisture), that are commonly less palatable than canned foods but more palatable than dry foods.

According to this classification, the terms "dry pet food" mean a pet food having less than 15% moisture. Typically, dry pet food is produced as kibbles. The term "kibbles" refers to particulate pieces formed by either a pelleting or extrusion process. The pieces can vary in sizes and shapes, depending on the process or the equipment. Importantly, the dry pet food of the present invention is a crunchy, crispy food. More particularly, the dry pet food of the present invention is under the form of kibbles that are crunchy, crispy pieces. This means that a relative force is required to bite the food in the mouth, and that a low sound is generally generated upon deformation and/or fracture. This differs from wet and semi-moist pet food that present a soft texture easy to chew, with pliable characteristics.

The term "moisture" is the total amount of water present in a food, or in a sample thereof. The moisture of a pet food is a standard quantitative parameter that can be easily determined by the person skilled in the art using conventional techniques and means.

The term "palatability" means a relative preference of an animal for one food composition over another. Palatability may be determined by a standard testing protocol wherein the animal has equal access to both compositions. Such preference can arise from any of the animal's senses, but typically relates to taste, aroma, flavour, texture, and mouth-feel. A pet food, especially a cat food, herein indicated as having "enhanced" or "improved" or "increased" palatability is one for which a pet animal, especially a cat, exhibits preference relative to a control food composition. The terms "palatability enhancers" or "palatants" or "flavours" or "palatability agents" or "appetizing factors" or "palatant components" or "palatability materials" mean any material that enhances the palatability of a food composition to an animal. A palatability enhancer may be a single material or a blend of materials. When a blend of materials, it is not necessary that all materials in the blend be palatable or be as palatable as each other, provided that the blend as a whole is palatable. Also, a palatability enhancer may be natural, processed or unprocessed, synthetic, or part of natural and part of synthetic materials. Palatability enhancers can be liquids or powders (dry). They can be used by coating and/or by inclusion. Palatability enhancers are commonly used in the technical field of the present invention. A large variety of palatability enhancers are thus commercially available.

The terms "palatability-enhancing kit" is a kit comprising one or more palatability enhancers and or one or more appropriate food ingredients such as phyllosilicates, glucomannans and functional equivalents thereof (such as galactomannans), and water-binding proteinaceous materials containing at least 65% proteins.

In the context of the present invention, an "ingredient" or a "food ingredient" is a pet food additive or a pet food component that is used for conferring palatability to a pet food preparation or for improving said palatability. An ingredient as defined herein has water-binding properties that have been found by the Inventors to be of high interest for modifying the dry pet food texture in such a way that this pet food is palatable to the pet. More precisely, an ingredient is herein selected from phyllosilicates, glucomannans and functional equivalents thereof, water-binding proteinaceous materials containing at least 65% proteins, and combinations thereof. Phyllosilicates are sheet silicates, formed by parallel sheets of silicate tetrahedra with $Si_2O_5$ or a 2:5 ratio. The term "phyllosilicate" is generically used herein to encompass any mineral including but not limited to: Akermatite, Aliettite, Allophane, Aluminoceladonite, Amesite, Anandite, Annite, Antigorite, Apophyllite, Aspidolite, Baileychlore, Batavite, Beidellite, Bementite, Bensonite, Bentonite, Berthierine, Biotite, Bismutoferrite, Bityite, Boromuscovite, Borocookeite, Bowlingite, Brammalite, Brindleyite, Bronrobersite, Brokenhillite, Burckhardtite, Caryopilite, Cavansite, Celadonite, Chamosite, Champmanite, Chernykhite, Chlorite, Chlorite group, Chromceladonite, Chromphyllite, Chrysocolle, Chrysolite; Chrysotile, Clay mineral group, Clinochlore, Clintonite, Cookeite, Corrensite, Cronstedtite, Damouzite, Delessite, Dickite; Donbassite, Dozyite, Eastonite, Eirikite, Ephesite, Falcondoite, Fedorite, Ferripyrophyllite, Ferrisurite, Ferro-aluminoceladonite, Ferroceladonite, Ferrokinoshitalite, ferrosaponite, Fireclay, Fluorannite, Fluorophogopite, Fraipontite, Franklinfurnaceite, Friedelite, Fuchsite, Ganterite, Garnierite, Gehlenite, Glagolevite, Glauconite, Gonyerite, Greenalite, Grumantite, Gyrolite, Halloysite, Hectorite, Hendricksite, Hisingerite, Hydrobiotite, Illite, Imogolite, Intersilite, Kalifersite, Kaolinite, Karpinskite, Kegelite, Kellyite, Kinoshitalite, Kulkeite, Kurumsakite, Lalondeite, Ledikite, Leifite, Lepidolite, Lizardite, Loughlinite, Lunijianlaite, Macaulayite, Makatite, Manandonite, Manganoneptunite, Margarite, Martinite, Masutomilite, Magillite, Medicinal clay, Melilite, Mica group, Mica, Minehillite, Minnesotaite, Montdorite, Montmorillonite, Muscovite, Nacrite, Nafersite, Nanpingite, Natrosilite, Nelenite, Neotocite, Nepouite, Niksergievite, Nimite, Nontronite, Norrishite, Odinite, Okenite, Orlymanite, Orthochamosite, Oxykinoshitalite, Palygorskite (attapulgite), Paragonite, Pecoraite, Pennantite, Petalite, Phlogite, Phlogopite, Polylithionite, Preiswerkite, Pyrophyllite, Pyrosmalite-(Fe), Pyrosmalite-(Mn), Raite, Rectorite, Reyerite, Roscoelite, Saliotite, Saponite, Sarcolite, Sauconite, Schallerite, Sepiolite, Sericite, Serpentine, Serpentine group, Shafranovskite, Shirokshinite, Shirozulite, Siderophyllite, Smectite, Sokolovaite, Spadaite, Stevensite, Stilpnomelane, Sudoite, Suhailite, Surite, Swinefordite, Tainiolite, Talc, Telyushenkoite, Tetra-ferripholgopite, Tetraferriannite, Tobelite, Tosudite, Trilithionite, Tupperssuatsiaite, Tungusite, Truscottite, Ussingite, Varennesite, Vermiculite, Volkhonskoite, Watatsumiite, Willemseite, Wonesite, Yakhontovite, Yofortierite, Zakharovite, Zeophyllite, Zincsilite, and Zinnwaldite. Any type or form of phyllosilicate that is acceptable for use in a pet food may be used in the present invention. Preferred examples of phyllosilicates suitable for use in the present invention are selected from montmorillonite, bentonite, kaolinite, sepiolite, and vermiculite. Zeolite (or zeolithe) does not belong to the phyllosilicate but to the tectosillicate class.

Glucomannan is a polysaccharide composed of long chains of simple sugars, primarily mannose and glucose. It is classified as a water-soluble fiber. It is commonly isolated from konjac root (Amorphophallus konjac) but can also be isolated from other natural sources as plants or yeasts. Konjac glucomannan does not contain any wheat, gluten, carbohydrates, calories, fat, protein or sugar. The molecular weight of konjac glucomannan varies from 200,000 to 2,000,000 depending on the species or variety, the processing method and even the storage time of raw material. Glucomannan may also be referred to as, inter alia: Konjac glucomannan, Manna, Konjac, Konjac Fiber, Konjac flour, Konnyaku, Elephant-Foot Yam, and Devil's Tongue. Konjac glucomannan is known to have properties of reversible water-holding capacity and thermo-non-reversible gel formation.

The terms "functional equivalents of glucomannans" are to be construed here to encompass any compounds, structurally-related to glucomannans or not, that have water-binding properties. Thus, the only requirement for a compound to be a functional equivalent of glucomannan is that it is capable of binding water, even if it binds water less efficiently than glucomannans. It will be however advantageous to use compounds that are capable of binding water to the same extent as glucomannans Preferred functional equivalents of glucomannans are galactomannans, including without limitation, guar gum, locust bean gum, tara gum, and cassia gum.

The terms "water-binding proteinaceous materials" are herein synonymous of "proteins having textural functional properties" by contrast to any protein included in pet foodstuffs for nutritional purposes. In the present context, water-binding proteinaceous materials are pet food components having at least water-binding ability or water holding capacity (WHC). They can have further interesting physicochemical properties, including other textural properties such as fat-binding, gelation, whippability, and the like. These properties may contribute with water-binding ability to impart palatability and/or other advantageous features to the food from an organoleptic and/or textural (but not nutritional) point of view. For the purposes of the present invention, water-binding proteinaceous materials contain at least about 65%, preferably at least about 70%, yet preferably at least about 75%, and even more preferably at least about 80%, 85%, 90%, 95%, proteins. These proteinaceous materials preferably are natural, from animal or vegetal origin. These proteinaceous materials are more preferably from animal origin.

Water-binding proteinaceous materials useful in the present invention include without limitation pea protein concentrates, soya protein concentrates, soya protein isolates, and more preferably animal proteinaceous materials as whey protein concentrates, sodium caseinates, natural cold setting pork proteins, and functional equivalents thereof.

By "functional equivalents thereof", it is meant herein water-binding proteinaceous materials as defined above, from animal origin and containing at least about 65% proteins, preferably at least about 70%, yet preferably at least about 75%, and even more preferably at least about 80%, 85%, 90%, 95%, proteins. Advantageously, these "functional equivalents" further are proteinaceous materials containing at least about 4% hydroxyproline. Preferably, they contain at least about 5% hydroxyproline. In particular, they contain from about 4 to about 20% hydroxyproline, preferably from about 4 to about 15% hydroxyproline. Yet preferably, they contain from about 5 to about 20% hydroxyproline, even more preferably from about 5 to about 15% hydroxyproline.

As mentioned above, "proteins having textural functional properties" are proteins having water-binding capacity (resulting in, e.g., hydrogen bonding of water, water-absorption, entrapment of water), but they may have additional textural and/or organoleptic properties such as solubility, thickening, gelation (protein matrix formation and setting), elasticity (formation and stabilization of fat emulsions), flavor binding (adsorption, entrapment, release), etc.

The term "texture" herein refers to the distinctive physical composition or structure of a pet food, in particular of a dry pet food and especially of a dry cat food. The term "hardness" means a measure of the resistance of a material to surface indentation and abrasion. The term "hardness" is also equivalent to "peak force" or "maximal force". The term "maximal force" (or FMax) is defined as the force of the first compression enquired for sample's breakage. It represents the resistance of extrudate to initial penetration. Usually a hard product will be associated with high maximal force. The expressed unit of "Force" is Newton (N).

The term "deformation" is represented as the point (distance) at which the peak force is reached. The term "deformation" is also equivalent to "strain" or to "travel" or to "distance of penetration". It is attributed to a measurement of how far the probe has travelled to reach the maximum force. The expressed unit of deformation is millimetre (mm)

The term "rigidity" represents the amount of resistance with which a body opposes change of form. The "rigidity" parameter is calculated as being equal to Maximal Force (N) divided by deformation (mm) The rigidity can also be called "firmness". Instrumental firmness is primarily the deformation modulus of the material under test and was obtained from the slope of the initial linear portion of the force deformation curve (Anton et al, 2007; Ravi et al, 2007). Firmness is commonly measured for foods such as snacks food extrudates, cornstarch extrudates, chewing gums, and the like. Rigidity can be compared to Young's modulus, which describes the tendency of an object to deform along an axis when opposing forces are applied along that axis. Young's modulus is defined as the ratio of stress to strain. A material with a high Young's modulus is told "rigid".

The term "work" is defined as an estimate of work. It corresponds to the work necessary to induce the first major failure of the sample and expresses the ability of the material to absorb mechanical energy prior to failure. It is the area of the curve until y=Fmax (Maximal Force) and it is expressed as N.m or Joules.

The term "water activity" (or Aw) is a measurement of the energy status of the water in a system. It is represented by a quotient between water's partial pressure in the food and pure water's partial pressure. It indicates how tightly water is bound, structurally or chemically, within a substance. This is measured by equilibrating the liquid phase (in the sample) with the vapor phase (in the headspace) and measuring the relative humidity of that space. The term "density" or "bulk density" means a measure of how much mass is contained in a given unit volume. It is commonly expressed in grams per litre (g/L). Density may be measured using a cubic box or cylindrical tube having one litre volume capacity.

Description of the Invention

The Inventors could observe that the food texture has an impact onto food consumption by pets. This impact is generally significant in all pets, including dogs and cats. However, in the latter, the food texture appears to be of very high relevance. These observations led the Inventors to try to find means for binding and/or entrapping water in the food, expecting a positive impact onto food palatability. By doing so, they indeed could show for the first time, as it is reported in detail herein, that producing specifically textured foods could enhance palatability of dry cat foods, and in turn favour food consumption by cats.

An aspect of the present invention relates to a method for producing a palatable dry cat food, comprising at least:
a) producing a dry cat food preparation having a rigidity below or equal to about 100 N/mm;
b) adding at least one palatability enhancer to said dry cat food preparation; and
c) obtaining a palatable dry cat food, wherein said palatable dry cat food has a rigidity below or equal to about 100 N/mm.

In one embodiment, said dry cat food is single-textured. Alternatively, said dry cat food may be a mix of single-textured dry cat foods, each thereof having a rigidity below or equal to about 100 N/mm.

The rigidity of said dry cat food preparation in step a) and/or of said palatable dry cat food obtained in step c) of the method according to the invention is preferably from about 50 N/mm to about 100 N/mm, yet preferably from about 55 N/mm to about 95 N/mm, and yet more preferably from about 60 N/mm to about 90 N/mm.

In the method according to the present invention, several ways to reach the targeted food rigidity may be used alone or in combination. Preferred examples of suitable ways are described below.

In one embodiment, said dry cat food preparation in step a) above comprises at least one ingredient selected from:
phyllosilicates,
glucomannans and functional equivalents thereof,
water-binding proteinaceous materials containing at least about 65% proteins, and
combinations thereof.

These ingredients will be used alone or in combination, at an appropriate dose for achieving the final rigidity of the dry cat food preparation, said rigidity being below or equal to about 100 N/mm Such doses will be easily determined by the person skilled in the art using standard methods.

Another aspect of the present invention thus relates to a method for producing a palatable dry cat food, comprising at least:
a) producing a dry cat food preparation comprising at least one ingredient selected from:
phyllosilicates,
glucomannans and functional equivalents thereof,
water-binding proteinaceous materials containing at least about 65% proteins, and
combinations thereof;
b) adding at least one palatability enhancer to said dry cat food preparation; and
c) obtaining a palatable dry cat food.

Preferably, said palatable dry cat food has a rigidity below or equal to about 100 N/mm. The rigidity of said dry cat food preparation in step a) and/or of said palatable dry cat food obtained in step c) of the method according to the invention is preferably from about 50 N/mm to about 100 N/mm, yet preferably from about 55 N/mm to about 95 N/mm, and yet more preferably from about 60 N/mm to about 90 N/mm.

Dry pet foods represent a nutritionally balanced mixture containing proteins, fibres, carbohydrates and/or starch, fats. Such mixtures are well known to those skilled in the art, and their composition/formulation depends on many factors such as, for example, the desired food balance for the specific category of pets. In addition to these base elements, the food may include vitamins, minerals and other additives such as seasonings, preservatives. Specific suitable amounts for each component in a composition will depend on a variety of factors such as the species of animal consuming the composition, the particular components included in the composition, the age, weight, general health of the animal, and the like. Therefore, the component amounts may vary from one embodiment to another. The food balance, including the relative proportions of vitamins, minerals, lipids, proteins and carbohydrates, is determined according to the known dietary standards in the veterinary field, for example by following recommendations of the National Research council (NRC), or the guidelines of the American Association of Feed Control Officials (AAFCO).

All conventional protein sources may be used, obtained from a variety sources such as plants, animals, or both Animal proteins include poultry meal, meat meal and bone meal, fish meal, casein, egg powder, albumin, and fresh animal tissue, for example fresh meat tissue and fresh fish tissue. Plant proteins include wheat gluten or gluten meal, soya. Other types of proteins include microbial proteins such as yeast.

The fat and carbohydrate food ingredient is obtained from a variety of sources such as animal fat, fish oil, vegetable oil, meat, meat by-products, grains, other animal or plant sources, and mixtures thereof. Grains include wheat, corn, barley, and rice. The fiber food ingredient is obtained from a variety of sources such as vegetable fiber sources, e.g., cellulose, beet pulp, peanut hulls, and soy fiber.

The food preparations may contain additional components such as vitamins, minerals, fillers, palatability enhancers, flavors, stabilizers, coatings, and the like, well known to the skilled artisans. Therefore, the component amounts may vary from one embodiment to another. Standard dry cat food formulations are well known to the person skilled in the art. Examples of recipes are given in, e.g., International patent application No. WO 2003/039267.

Preferably, said dry cat food preparation in step a) above comprises said at least one ingredient in combination with at least one palatability enhancer, the latter being appropriate for incorporation by inclusion into the cat food preparation.

Advantageously, in step a) above, the cat food preparation is extruded prior to drying. Preferably, extrusion is performed under appropriate conditions in order to obtain an extruded cat food preparation having a density from about 300 g/L to about 450 g/L. Yet preferably, the extruded cat food preparation has a density from about 350 g/L to about 400 g/L.

The final moisture of the dry cat food (preparation) is less than 15% moisture. Preferably, said final moisture is from about 3% to about 10%. Yet preferably, it is from about 3% to about 8%. Such a moisture content of the dry cat food leads to a water activity below 0.65. This is sufficient to prevent growth of pathogenic microorganisms in the product. Therefore, there is no need for adding humectants (include, but not limited to, propylene glycol, glycerol, sugar, sorbitol and salt) or antimicrobials agents (include, but not limited to, potassium sorbate, propionic acid and its salts, sodium benzoate, nitrites and nitrates salts).

Prior to drying, or prior to extrusion and drying, the cat food preparation may be ground under appropriate conditions for obtaining fine food particles, such as particles having an about 500-to about 1500-µm diameter, with a preferred range from about 500-to about 1000-µm diameter. Dry pet foods are commonly prepared by different methods. One of these methods, that is a widely used one, is a cooker-extruder method. Dry ingredients, including animal protein sources, plant protein sources, grains, etc., are ground and mixed together. Moist or liquid ingredients, including fats, oils, animal protein sources, water, etc., are then added to and mixed with the dry mix. The mixture is then processed into kibbles or similar dry pieces. Kibble is often formed using an extrusion process in which the mixture of dry and wet ingredients is subjected to mechanical work at a high pressure and temperature, and forced through small openings or dies and cut off into kibble by a rotating knife. This die forms the extruded product into a specific shape. The wet kibble is then dried in a hot air dryer. Generally, the product is dried until it contains less than 15% moisture, and typically about 5 to 10% moisture. The dried particles or pieces are then transferred by conveyor to a coating system and sprayed with fat. Particles can optionally be coated with one or more topical coatings, which may include palatability enhancers, flavours, powders, and the like.

Noticeably, in step a) of the method as described above, the dry cat food preparation and/or any of the components thereof is (are) not contacted with alpha-amylase.

In one embodiment of the method of the present invention, in step b) as defined above, said added palatability enhancer is selected from liquid and/or dry palatability enhancers, and combinations thereof. Such a palatability enhancer is appropriate for being added to the cat food by coating.

Coating, as used herein, refers to the topical deposition of the palatability enhancer or flavour composition onto the surface basal composition, such as by spraying, dusting, or the like. For example, kibbles of uncoated, extruded basal pet food can be placed in a container such a tub or a coating drum for mixing. A fat, such as pork fat or poultry fat, is heated and then sprayed onto the pet food in a manner to obtain a coating of the kibbles. The coating need not to be a continuous layer, but preferably is uniform. After the fat, a palatability enhancer may be applied as either a liquid or a dry powder, or both, while the kibbles are mixed. A liquid palatability enhancer is typically sprayed on, while a dry palatability enhancer is typically dusted on. Alternatively, palatability enhancers could be mixed with the fat and applied concurrently. In another alternative method of coating, palatability enhancers are coated before deposition of fat. Another aspect of the present invention concerns a palatable dry cat food obtainable by a method as described above. Preferably, this palatable dry cat food has a rigidity below or equal to about 100 N/mm.

Yet another aspect of the present invention relates to the use of at least one ingredient selected from:
phyllosilicates,
glucomannans and functional equivalents thereof,
water-binding proteinaceous materials containing at least about 65% proteins, and
combinations thereof,
for preparing a palatable dry cat food preferably having a rigidity below or equal to about 100 N/mm.

Yet another aspect of the present invention is directed to a method for increasing the palatability effect of a liquid palatability enhancer intended to be added to a dry cat food, comprising at least:
a) providing a dry cat food or a dry cat food preparation, wherein said dry cat food or said dry cat food preparation preferably has a rigidity below or equal to about 100 N/mm;
b) adding said liquid palatability enhancer to said dry cat food or said dry cat food preparation; and
c) obtaining a palatable dry cat food, wherein the palatability effect of said liquid palatability enhancer is increased.

In step b), addition of the liquid palatability enhancer to the food or the food preparation is done by coating.

Preferably, said dry cat food or said dry cat food preparation in step a) is produced as per step a) of the method for producing a palatable dry cat food as described above.

Further aspects of the present invention are related to palatability-enhancing kits useful for producing palatable dry cat foods preferably having a rigidity below or equal to about 100 N/mm and/or for enhancing palatability of dry cat foods preferably having a rigidity below or equal to about 100 N/mm.

In one embodiment, such a palatability-enhancing kit contains at least one ingredient selected from:
phyllosilicates,
glucomannans and functional equivalents thereof,
water-binding proteinaceous materials containing at least about 65% proteins, and
combinations thereof.

Preferably, such a kit further contains at least one palatability enhancer, especially at least one palatability enhancer suitable for use by inclusion into the food.

In another embodiment, a kit according to the present invention contains at least one liquid palatability enhancer and at least one dry palatability enhancer as a combined preparation for simultaneous, separate or sequential use for increasing the palatability of a dry cat food having preferably a rigidity below or equal to about 100 N/mm. These palatability enhancers are preferably suitable for being added to the food by coating.

Preferably, such a kit further contains at least one ingredient selected from:
phyllosilicates,
glucomannans and functional equivalents thereof,
water-binding proteinaceous materials containing at least about 65% proteins, and
combinations thereof.

In yet another embodiment, a palatability-enhancing kit according to the present invention contains:
a) at least one ingredient selected from:
phyllosilicates,
glucomannans and functional equivalents thereof,
water-binding proteinaceous materials containing at least about 65% proteins, and
combinations thereof, and
b) at least one palatability enhancer,
as a combined preparation for simultaneous, separate or sequential use for producing a palatable dry cat food preferably having a rigidity below or equal to about 100 N/mm. Here, the palatability enhancer(s) provided in the kit may be for a use by inclusion and/or by coating.

Another aspect of the present invention concerns a method for feeding a cat, comprising: feeding a cat, a palatable dry cat food as described above.

The invention can be further illustrated by the following examples, although it will be understood that these examples are included merely for purposes of illustration and explanation, and are not intended in any way to limit the scope of the present invention.

EXAMPLES

A—Materials and Methods
Texture Measurement

Figure 2:
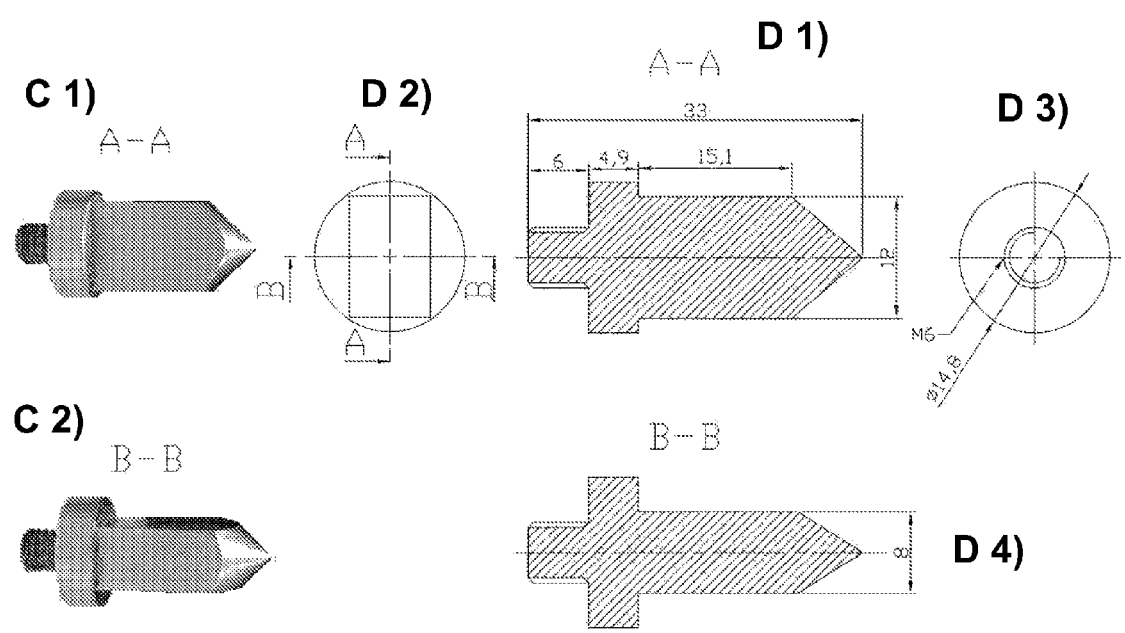
FIG. 2: Probe photographs and details. The photographs C1) and C2) are views of the stainless cone probe observed under 2 different angles. The pictures D1), D2), D3) and D4) are technical cross section views with dimensions given in millimeters.
Figure 3:
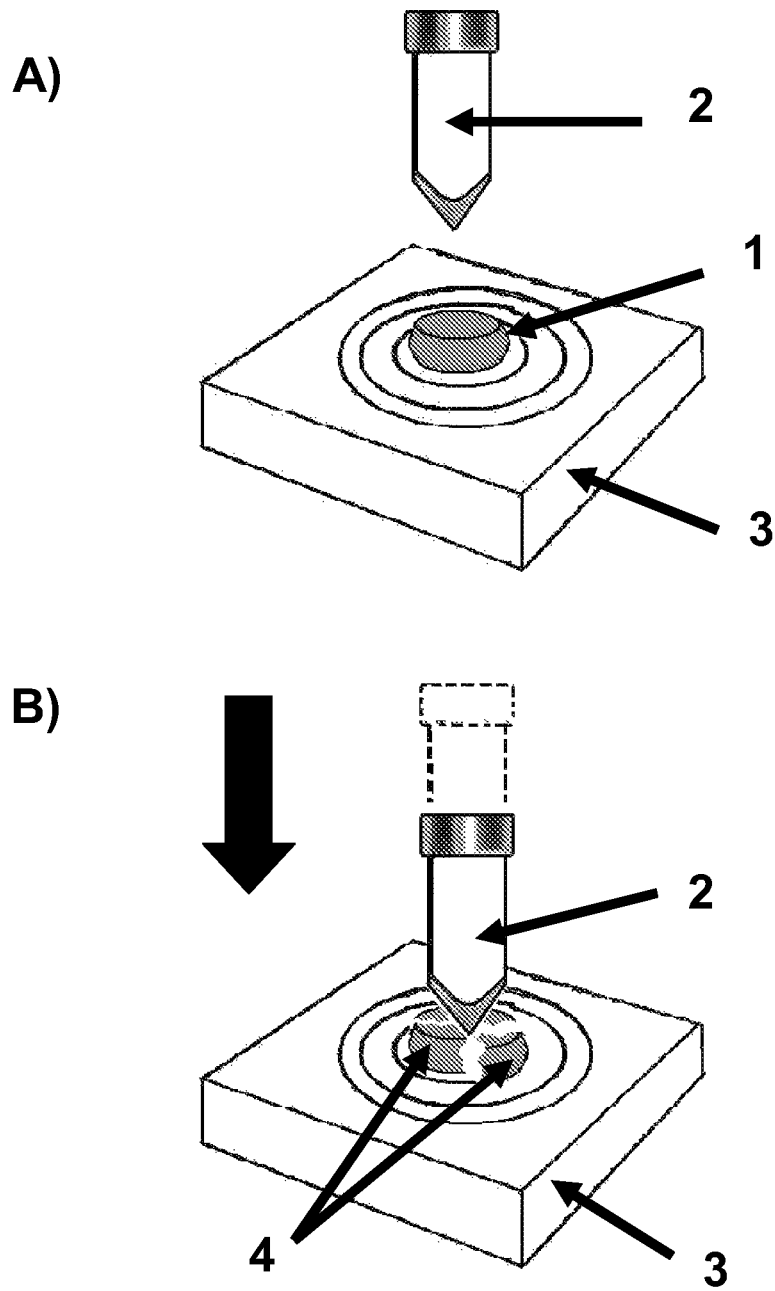
FIG. 3: Schematisation of a product texture analysis using a TA Plus Texture Analyzer. A: (1) Kibble to be analyzed; (2) cone probe; (3) table base. B: (2) cone probe; (3) table base; (4) pieces of kibble.

Texture measurements were performed with a Lloyd TA plus Texture Analyzer (Lloyd Instruments, trademark of AMETEK, Inc. and part of AMETEK Measurement & Calibration Technologies (Lloyd Instruments Ltd; Steyning Way Bognor Regis West Sussex, P022 9ST, UK; AMETEK, Inc. 37 N. Valley Road, Building 4 P.O. Box 1764 Paoli, Pa. 19301 U.S.A) (FIG. 1). This texture analyzer has been conceived to perform test compression until breaking (FIG. 3). It measures force and deformation, and the stress-strain curve. The device is composed of a full bridge strain gauged load cell, a stainless steel cone probe (FIG. 2), a base table where the analyzed product is put. The cone probe (FIG. 2) has been designed to resemble to a dog tooth so that the analyzer can mimic the biting of a dog. This device is also appropriate and conventionally used for cat food analysis.

A puncture test was run measuring force over distance using a piece of equipment such as the TA plus Texture Analyzer (FIG. 1). Each piece or sample "1" is placed on the base of the analyzer, under the probe, so that the probe "2" will contact the narrowest point of the sample at a direction of a 90° angle while the sample is positioned lying flat on the base as illustrated in FIG. 3.

Figure 4:
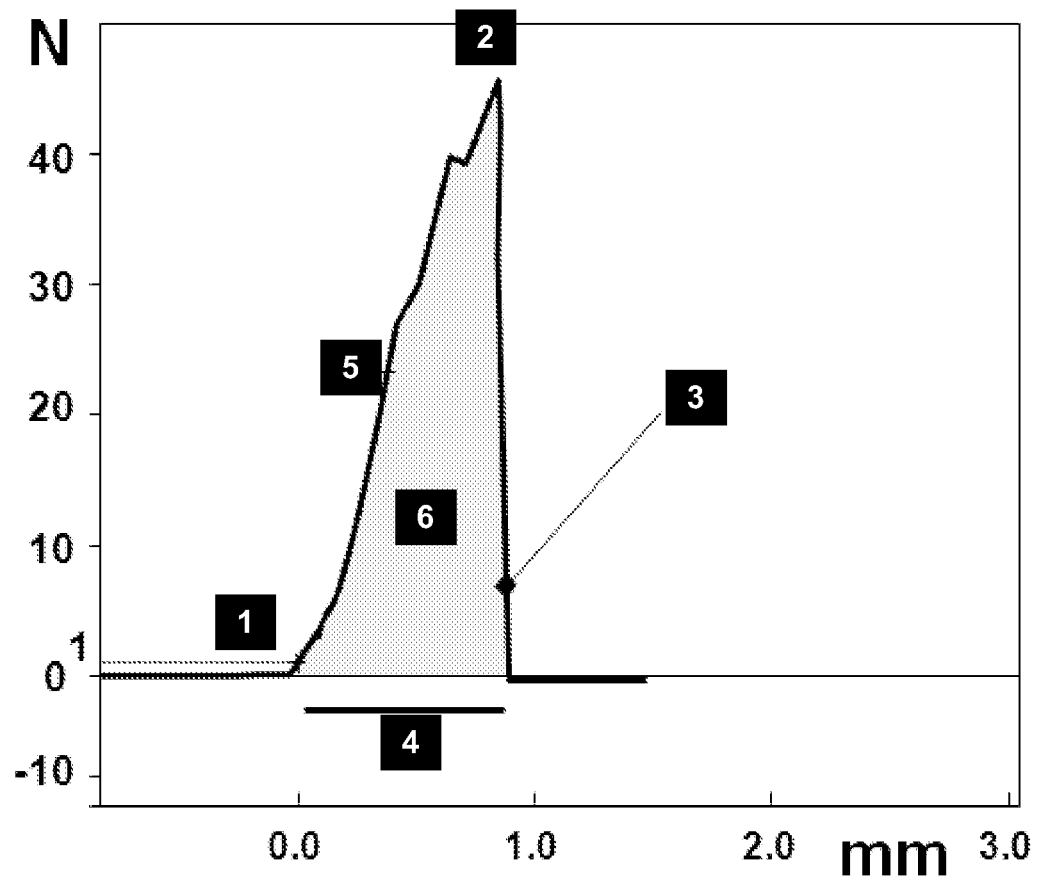
FIG. 4: Graph representing the texture of a standard dry cat food as measured with a TA Plus Texture Analyzer according to a compression-until-breaking procedure. (1) Preload; (2) highest peak (i.e., Max Force (N)); (3) breaking detection corresponding to 0.15× Max Force; (4) deformation after preload detection (in mm); (5) slope (i.e., rigidity (N/mm)); (6) surface under the curve until y=Max Force (i.e., work (J or N.m)).

The probe "2" runs at a test speed of 35 mm/minute (speed of probe before contact with the sample). The force in Newton N (y axis) is plotted against distance in mm (x axis). The "starting force" or "preload" is 1 N. It represents the value of the "pre-loading" in order to prevent measuring differences that would only be due to variations in size or shape of the kibbles and to have comparable data independently of any specific shape or size of the kibbles. The preload permits to exclude the distance covered by the probe from the starting point until it contacts the sample. Without this preload, a difference in kibble thickness would induce a different deformation measure. The Max Force is the maximum amount of force needed to achieve the kibble breaking (FIG. 4). The following parameters were measured: the Max Force (N), which is the maximum force value of the curve, the Deformation (mm) and Work (N.m) which is the area under the curve (FIG. 4). For each of these parameters, the measurement was the average of the values of at least 40 samples of the product tested. The rigidity parameter (N/mm) was calculated for each piece analyzed, as the slope of the stress-strain curve. The final rigidity value was the average of the values of at least 40 samples of the product tested.

Palatability Assessment

Palatability effects are conventionally measured by a test that is known as the "two-bowl test" or "versus test". Of course, the person skilled in the art is free to use any other appropriate test than the two bowl test herein described to determine preference. Such alternative tests are well known in the art.

Principle of the two-bowl test:

The test is based on the postulate whereby the more food consumed, the more palatable it is. Individual versus or Two bowls appetence tests, based on the comparison between two foods, were carried out, with bowls presented simultaneously and sides (right and left) were daily reversed. Tests are performed on panel of 40 cats.

Operating method of the test:
Identical amounts of food A and food B were weighed out and placed in identical bowls. The amount present in each ration enables the daily requirements to be met.

Distribution of the bowls:
The bowls were presented at the same time to each cat in an individual loose box and their positions were switched at each meal to avoid a choice lead by handedness.

Duration of the cat palatability test:
15 minutes minimum (if one of the two bowls was entirely eaten before 30 minutes, the two bowls were removed, and the test was stopped) to 16 hours maximum.

Parameters Studied
Measured parameters: First food consumed and amount of each food consumed by the end of the test
Calculated parameters: individual consumption ratio in % (CR)

$$CR_A = \text{consumption of } A(g) \times 100/\text{consumption of } A+B(g)$$

$$CR_B = \text{consumption of } B(g) \times 100/\text{consumption of } A+B(g);$$

⇒ Average consumption ratio (ACR)=average of each individual ratios (an equal importance is given to each animal, regardless of its size and of its corresponding consumption)

If animals have higher or lower consumption compared to determined values, they are not taken into account into statistical treatment Statistical Analysis:
Statistical analysis was used to determine if there was a significant difference between the 2 ratios: ACR ⇒ Student's t-test with 3 error thresholds, namely 5%, 1% and 0.1%.

A Chi test was used to determine if there was a significant difference between the number of cats with Food A as first food eaten and the number of cats with Food B as first food eaten. Significance levels are noted as below:

| NS | not significant | ($p > 0.05$) |
| * | significant | ($p < 0.05$) |
| ** | highly significant | ($p < 0.01$) |
| *** | very highly significant | ($p < 0.001$) |

B—Examples

Example 1

Example of Coated Kibbles of Different Rigidity Values: Below 50 N/mm, between 50 N/mm and 100 N/mm, and above 100 N/mm Kibbles have been coated with 3% poultry fat, then 3% super premium liquid palatability enhancer and then 1% super premium dry palatability enhancer.

As shown in Table 1 below, dry cat food compositions that had higher rigidity value but below 100 N/mm exhibited greater intake ratios than dry cat food compositions that had lower rigidity value. Results showed that the palatability preference was so more significant that the rigidity values for the two compared dry cat food compositions were between 20 N/mm and 68 N/mm and more preferably between 20 N/mm and 57 N/mm. Palatability results showed that differences of intake ratio were significantly decreased for two dry cat food compositions that had rigidity values between 57 N/mm and 92 N/mm and more preferably between 67 N/mm and 92 N/mm The results in Table 1 below also exhibited that the dry cat food compositions that had rigidity below 100 N/mm (72 N/mm) exhibited greater intake ratio than dry cat food composition that had rigidity value above 100 N/mm (112 N/mm).

These results clearly demonstrate the relevance of fixing an upper limit to the dry cat food rigidity at about 100 N/mm.

Example 2

Inclusion of Specific Ingredients (Phyllosilicates, Glucomannans and Proteins Having Functional Properties) into the Cat Food Preparation Before Extrusion of the Final Kibbles. Example of Kibbles Coated with Poultry Fat, Liquid and Dry Palatability Enhancers This example demonstrates the effect of phyllosilicates, glucomannans and proteins having functional properties as texture agents which increase the rigidity value when added to a dry cat food composition and which in turn increase the palatability of the dry cat food composition. For each comparison, the preparations of dry cat foods were similar, with the difference being that the test composition included phyllosilicates, and/or glucomannans and/or proteins having functional properties, incorporated to the dough before extrusion. The test compositions were compared against the control composition in a palatability test. All kibbles have been coated with 6% poultry fat, then 3% super premium liquid palatability enhancer and then 1% super premium dry palatability enhancer. Rigidity measurements have been determined for each cat food composition. The experiment has been conducted onto different kibbles compositions. As shown below in Table 2 below, the experimental tests compositions, including specific ingredients, exhibited greater intake preference than the control compositions, while the rigidity values are higher for those test compositions than for the control compositions.

TABLE 1

| Product A rigidity (N/mm) | Product B rigidity (N/mm) | Ref tests | | % A | % B | Significance (Student test) |
|---|---|---|---|---|---|---|
| 20 | 37 | C0700103 | Day 1 | 23 | 77 | *** |
|    |    |          | Day 2 | 24 | 76 | *** |
| 37 | 57 | C0700102 | Day 1 | 32 | 68 | *** |
|    |    |          | Day 2 | 25 | 75 | *** |
| 57 | 68 | C0700101 | Day 1 | 36 | 64 | * |
|    |    |          | Day 2 | 43 | 56 | NS |
| 67 | 92 | C0801683 | Day 1 | 57 | 43 | NS |
|    |    |          | Day 2 | 59 | 41 | NS |
| 72 | 112 | C0801874 | Day 1 | 63 | 37 | ** |
|    |    |          | Day 2 | 60 | 40 | * |

(NS): Not Significant ($p > 0.05$)
(*): significant ($p < 0.05$),
(**): highly significant ($p < 0.01$),
(***): very highly significant ($p < 0.001$)

TABLE 2

| Product A | Product B | Ref tests | Product A rigidity (N/mm) | Product B rigidity (N/mm) | Consumption ratio | | | Significance (Student test) |
|---|---|---|---|---|---|---|---|---|
| | | | | | | % A | % B | |
| Dry cat food 1 with 2% phyllosilicate | Dry cat food 1 control | C0800916 | 59 | 51 | Day 1 | 64 | 36 | ** |
| | | | | | Day 2 | 60 | 40 | * |
| Dry cat food 3 with 2% phyllosilicate | Dry cat food 3 control | C0801796 | 56 | 50 | Day 1 | 61 | 39 | * |
| | | | | | Day 2 | 65 | 35 | ** |
| Dry cat food 1 with 0.5% glucomannan | Dry cat food 1 control | C0800918 | 61 | 49 | Day 1 | 69 | 31 | *** |
| | | | | | Day 2 | 65 | 35 | * |
| Dry cat food 1 with 1% glucomannan | Dry cat food 1 control | C0802610 | 63 | 47 | Day 1 | 62 | 38 | ** |
| | | | | | Day 2 | 66 | 34 | ** |
| Dry cat food 2 with 1% proteins with functional properties | Dry cat food 2 control | C0900036 | 70 | 62 | Day 1 | 61 | 39 | * |
| | | | | | Day 2 | 71 | 29 | *** |

(NS): Not Significant ($p > 0.05$),
(*): significant ($p < 0.05$),
(**): highly significant ($p < 0.01$),
(***): very highly significant ($p < 0.001$)
Proteins with functional properties = a natural cold setting pork protein,
Glucomannan = konjac powder,
Phyllosilicate = kaolinite

Example 3

Palatability Assessment of Dry Cat Food Comprising at Least One Ingredient Selected from Phyllosilicates, Glucomannans, and Proteins with Functional Properties, in Combination with a Palatability Enhancer This example demonstrates the effect of combining phyllosilicates, glucomannans and/or proteins with functional properties with palatable components for both increasing the rigidity value when added to a dry cat food composition and increasing the palatability of the dry cat food composition. For each comparison, the preparations of dry cat foods were similar, with the difference being that the test composition included phyllosilicates, or glucomannans or proteins with functional properties combined to palatable ingredients, incorporated to the dough before extrusion. Depending on tests, palatable components could be dry palatability enhancer, dry palatable meat meal and dry palatable fish meal.

The test compositions were compared against the control composition in a palatability test. The experiment has been conducted with different kibbles compositions, and with different top coatings, each composition being coated with 6% poultry fat, and then either 3% super premium liquid palatability enhancer and 1% super premium dry palatability enhancer, or 2% dry palatability enhancer. Rigidity measurements have been determined for each cat food composition. As shown below in Table 3 below, the experimental tests compositions, including specific ingredients combined with palatable components, exhibited greater intake preference than the control compositions, while the rigidity values are higher for those test compositions than for the control compositions.

Example 4

Relevance on Palatability, of the Drying Conditions Used for Preparing a Dry Cat Food This example demonstrates the effect of drying onto the rigidity values for dry cat food compositions dried at different moisture content levels, and the resulting enhancement of the palatability results.

For each comparison, the preparations of dry cat foods were similar, with the difference being that the compositions were dried at different moisture contents. The experiment has been conducted with different kibbles compositions, and with different top coatings, each compositions being coated with 6% poultry fat, and then either 3% super premium liquid palatability enhancer or 1% super premium dry palatability enhancer or both liquid and dry palatability enhancers. The compositions were compared in a palatability test. For each cat food composition, palatability tests have been conducted in order to compare cat food composition with higher moisture content and cat food composition with lower moisture content. Rigidity measurements have been determined for each cat food composition. As shown below in Table 4 below, the cat food compositions with lower moisture content exhibited greater intake preference than the cat food compositions with higher moisture content. The cat food compositions with lower moisture content exhibited higher rigidity value than the cat food compositions with higher moisture content.

TABLE 3

| Product A | Product B | Ref tests | Product A rigidity (N/mm) | Product B rigidity (N/mm) | Consumption ratio % A | Consumption ratio % B | Significance (Student test) |
|---|---|---|---|---|---|---|---|
| Top coating: 6% poultry fat, then 3% super premium liquid palatability enhancer and then 1% super premium dry palatability enhancer ||||||||
| Dry cat food 1 with (1% Glcm + 10% PE1) | Dry cat food control | C0802515 | 75 | 48 | Day 1   75 Day 2   75 | 25 25 | *** *** |
| Dry cat food 2 with (1% Glcm + 10% PE2) | Dry cat food control | C0801372 | 60 | 48 | Day 1   67 Day 2   68 | 33 32 | *** ** |
| Top coating: 6% poultry fat, then 2% super premium dry palatability enhancer ||||||||
| Dry cat food 3 with (1% Glcm + 5% PE1) | Dry cat food control | C0801179 | 64 | 48 | Day 1   69 Day 2   67 | 31 33 | *** *** |
| Dry cat food 4 with (1% Glcm + 5% PE2) | Dry cat food control | C0801181 | 57 | 48 | Day 1   70 Day 2   67 | 30 33 | *** *** |

(NS): Not Significant ($p > 0.05$),
(*): significant ($p < 0.05$),
(**): highly significant ($p < 0.01$),
(***): very highly significant ($p < 0.001$)
PE1 = Palatability enhancer 1 poultry based,
PE2 = Palatability enhancer 1 pork based,
Glcm = Glucomannan (konjac powder)

TABLE 4

| Product A | Product B | ref tests | Product A rigidity (N/mm) | Product B rigidity (N/mm) | Consumption ratio | | | Significance (Student test) |
|---|---|---|---|---|---|---|---|---|
| | | | | | | % A | % B | |
| Top coating: 6% poultry fat, then 1% super premium dry palatability enhancer | | | | | | | | |
| Dry cat food 1- 6% moisture content | Dry cat food 1- 7% moisture content | C0700099 | 58 | 48 | Day 1 Day 2 | 74 74 | 26 26 | *** *** |
| Dry cat food 1- 7% moisture content | Dry cat food 1- 9% moisture content | C0700097 | 48 | 27 | Day 1 Day 2 | 75 76 | 25 24 | *** *** |
| Top coating: 6% poultry fat, then 3% super premium liquid palatability enhancer | | | | | | | | |
| Dry cat food 3- 6% moisture content | Dry cat food 3- 7.5% moisture content | C0700094 | 54 | 48 | Day 1 Day 2 | 59 64 | 41 36 | * ** |
| Top coating: 6% poultry fat, then 3% super premium liquid palatability enhancer and then 1% super premium dry palatability enhancer | | | | | | | | |
| Dry cat food 4- 7.5% moisture content | Dry cat food 4- 9% moisture content | C0700102 | 57 | 37 | Day 1 Day 2 | 68 75 | 32 25 | *** *** |
| Dry cat food 4- 9% moisture content | Dry cat food 4- 10% moisture content | C0700106 | 38 | 26 | Day 1 Day 2 | 79 72 | 21 28 | *** *** |
| Dry cat food 5- 7 % moisture content- | Dry cat food 5- 8% moisture content- | 10035383 10035392 | 60 | 53 | Day 1 Day 2 | 65 71 | 35 29 | *** *** |

(NS): Not Significant (p > 0.05),
(*): significant (p < 0.05),
(**): highly significant (p < 0.01),
(***): very highly significant (p < 0.001)

Example 5

Relevance on Palatability, of the Extruding Conditions Used for Preparing a Dry Cat Food This example demonstrates the effect of extrusion onto the rigidity values for dry cat food compositions produced at different density levels and the resulting enhancement of the palatability results.

For each comparison, the preparations of dry cat foods were similar, with the difference being that the compositions were extruded either at 420 grams per liter density or at 340 grams per liter. The speed of the screws of the twin screws extruder and the vapor inlets have been modified in order to obtain the density values. Both cat food compositions have been dried at the same moisture content. All kibbles have been coated with 3% poultry fat, then 3% super premium liquid palatability enhancer and then 1% super premium dry palatability enhancer. Rigidity measurements have been determined for each cat food composition. Palatability tests have been conducted in order to compare cat food composition with higher density and cat food composition with lower density. As shown below in Table 5 below, the cat food compositions with lower density exhibited greater intake preference than the cat food compositions with higher density. The cat food compositions with lower density exhibited lower rigidity value than the cat food compositions with higher density. The cat food composition with higher density showed a rigidity value of 108 N/mm, that is over the about 100 N/mm upper limit.

TABLE 5

| Product A | Product B | ref tests | Product A rigidity (N/mm) | Product B rigidity (N/mm) | Consumption ratio | | | Significance (Student test) |
|---|---|---|---|---|---|---|---|---|
| | | | | | | % A | % B | |
| Dry cat food 1- 420 g/l density | Dry cat food 2- 340 g/l density | C0801886 | 108 | 55 | Day 1 Day 2 | 48 35 | 52 65 | NS *** |

(NS): Not Significant (p > 0.05),
(*): significant (p < 0.05),
(**): highly significant (p < 0.01),
(***): very highly significant (p < 0.001)

Example 6

Kibbles Produced with 2% Phyllosilicates Added by Inclusion Before Extrusion, Combined with Final Moisture Content Variation (Drying Conditions)

This example demonstrates the positive combined effect of adding phyllosilicates as a texture agent and of using appropriate drying conditions, for increasing the rigidity value and in turn the palatability of a dry cat food composition. For each comparison, the preparations of dry cat foods were similar, with the difference being that the test composition included phyllosilicates, incorporated to the dough before extrusion. Two levels of final moisture contents (6% and 8%) have been conducted. The tests compositions were compared against the control composition in a palatability test. All kibbles have been coated with 6% poultry fat, then 3% super premium liquid palatability enhancer and then 1% super premium dry palatability enhancer. Rigidity measurements have been determined for each cat food composition. The experiment has been conducted onto different kibbles compositions. As shown in Table 6 below, the phyllosilicate tests compositions exhibited greater intake preference than the control compositions, while the rigidity values are higher for the phyllosilicate tests compositions than for the control compositions. Lower moisture content (6%) kibbles show higher rigidity values than higher moisture content (8%).

TABLE 6

| Product A | Product B | Ref tests | Product A rigidity (N/mm) | Product B rigidity (N/mm) | Consumption ratio | | | Significance (Student test) |
|---|---|---|---|---|---|---|---|---|
| | | | | | | % A | % B | |
| Dry cat food 1 with 2% phyllosilicates- 8% Moisture content | Dry cat food Control 1- 8% moisture content | C0802120 | 49 | 38 | Day 1 Day 2 | 59 59 | 41 41 | * * |
| Dry cat food 3 with 2% phyllosilicates- 6% Moisture content | Dry cat food Control 3- 6% moisture content | C0800916 | 59 | 51 | Day 1 Day 2 | 64 60 | 36 40 | ** * |

(NS): Not Significant (p > 0.05),
(*): significant (p < 0.05),
(**): highly significant (p < 0.01),
(***): very highly significant (p < 0.001)
Phyllosilicate = kaolinite Example 7

Kibbles Produced with 0.5% or 1% Glucomannans Added by Inclusion Before Extrusion, Combined or not with Liquid Palatability Enhancer Added by Coating This example demonstrates the effect of glucomannans in increasing the appetizing effect of a liquid palatability enhancer when added to a dry cat food composition. Table 7 below gives the results of the 3 following sets of comparative experiments.

1) Effect of a liquid palatability enhancer in the absence of glucomannans: a dry cat food composition 1 without glucomannans added but coated with 6% poultry fat, then 3% super premium liquid palatability enhancer and then 1% super premium dry palatability enhancer exhibited a greater intake ratio than the same cat food composition 1 coated only with 6% poultry fat and 1% dry palatability enhancer. The rigidity value is lower for the dry cat food composition coated with liquid and dry palatability enhancers than for the dry cat food composition coated only with dry palatability enhancer.

2) Effect of glucomannans in the absence of a liquid palatability enhancer: the second comparison showed a higher intake ratio for a dry cat food composition 2 with glucomannans added in the dough before extrusion and coated with 6% poultry fat and 1% dry palatability enhancer compared to a dry cat food composition 2 without glucomannans added before extrusion and coated with 6% poultry fat and 1% dry palatability enhancer. For this second comparison, the rigidity value for the cat food composition with glucomannans was higher than the cat food composition without glucomannan addition.

3) Effect of a liquid palatability enhancer in the presence of glucomannans: the third comparison exhibited an increased appetizing effect and a more significant preference for a cat food composition 3 which combines glucomannans added in the dough before extrusion and coated with 6% poultry fat, then 3% super premium liquid palatability enhancer and then 1% super premium dry palatability enhancer than for a dry cat food composition 3 with glucomannans added in the dough before extrusion and coated with 6% poultry fat and 1% super premium dry palatability enhancer only. Results showed that the appetizing effect of the liquid palatability enhancer is higher significant when combined with glucomannans added in the dough before extrusion than the appetizing effect of the liquid palatability enhancer without glucomannans added. The rigidity value of the dry cat food composition with glucomannans added in the dough before extrusion and coated with liquid palatability enhancer is higher than the rigidity value of the dry cat food composition without glucomannans and coated with liquid palatability enhancer. The rigidity value of the dry cat food composition with glucomannans added in the dough before extrusion and coated with liquid palatability enhancer is also higher than the rigidity value of the dry cat food composition with glucomannans added in the dough and without liquid palatability enhancer added.

TABLE 7

| Product A | Product B | Ref tests | Product A rigidity (N/mm) | Product B rigidity (N/mm) | Consumption ratio | | | Significance (Student test) |
|---|---|---|---|---|---|---|---|---|
| | | | | | | % A | % B | |
| Dry cat food 1 coated 3% liquid PE + 1% dry PE | Dry cat food 1 coated 1% dry PE | C800919 | 48 | 54 | Day 1 Day 2 | 60 63 | 40 37 | * * |
| Dry cat food 2 with 1% Glcm coated 1% dry PE | Dry cat food 2 coated 1% dry PE | C800925 | 64 | 50 | Day 1 Day 2 | 60 59 | 40 41 | * * |
| Dry cat food 3 with 0.5% Glcm PE + 1% dry PE | Dry cat food 3 with 0.5% Glcm PE | C800927 | 65 | 59 | Day 1 Day 2 | 70 74 | 28 26 | ** *** |

(PE): Palatability enhancer,
(NS): Not Significant (p > 0.05),
(*): significant (p < 0.05),
(**): highly significant (p < 0.01),
(***): very highly significant (p < 0.001)
Glcm: glucomannans (konjac powder)

Example 8

Inclusion of Zeolite into a Cat Food Preparation before Extrusion of the Final Kibbles. Example of Kibbles Coated with Poultry Fat, Liquid and Dry Palatability Enhancers This example demonstrates the effect of zeolite when added to a dry cat food composition and which in turn does not increase the palatability of the dry cat food composition. For each comparison, the preparations of dry cat foods were similar, the only difference being that the test composition included zeolite, incorporated to the dough before extrusion. The test compositions were compared to a control composition in a palatability test. All kibbles have been coated with 6% poultry fat, then 3% super premium liquid palatability enhancer and then 1% super premium dry palatability enhancer. Rigidity measurements have been determined for each cat food composition. The experiment has been conducted onto same kibble compositions. As shown in Table 8 below, the experimental test compositions, including zeolite, did not exhibit greater intake preference than the control compositions, while the rigidity values are not higher for those test compositions than for the control compositions.

TABLE 8

| Product A | Product B | Ref tests | Product A rigidity (N/mm) | Product B rigidity (N/mm) | Consumption ratio | | | Significance (Student test) |
|---|---|---|---|---|---|---|---|---|
| | | | | | | % A | % B | |
| Dry cat food 1 with 2% zeolite | Dry cat food 1 control | C0901303 | 50 | 54 | Day 1 Day 2 | 43 34 | 57 66 | * *** |

(NS): Not Significant (p > 0.05),
(*): significant (p < 0.05),
(**): highly significant (p < 0.01),
(***): very highly significant (p < 0.001)

REFERENCES

Anton, A. A., Luciano, F. B. (2007). Instrumental texture evaluation of extruded snack foods: a review. *Ciencia y Tecnologia Alimentaria*, 5 (4) 245-251

Ravi, R., Roopa, B. S., Bhattacharya, S. (2007). Texture evaluation by uniaxial compression of some snack foods. *Journal of texture studies*, 38 (1) 135-152

The invention claimed is:

1. A method for producing a balanced and complete cat kibble having a rigidity from about 55 N/mm to about 95 N/mm and a moisture content from 3% to 8%, said method comprising at least the steps of:
   (i) adding 0.5% to 2% (% by weight of kibbles) of a texture-modifying ingredient selected from the group consisting of (a) phyllosilicates excluding zeolite and (b) glucomannans or galactomannans or both to cat food to impart a rigidity to cat kibble made from said cat food;
   (ii) extruding said cat food and forming it into cat kibble, wherein said extruded cat kibble has a density from about 300 g/L to about 450 g/L;
   (iii) drying said extruded cat kibble; and
   (iv) adding at least one palatability enhancer, distinct from said phyllosilicate, glucomannan, and galactomannan, to said cat kibble by coating, thereby obtaining said balanced and complete cat kibble having a rigidity from about 55 N/mm to about 95 N/mm and a moisture content from 3% to 8%.

2. The method according to claim 1, wherein in step (iv), said added palatability enhancer is selected from the group consisting of liquid palatability enhancers, dry palatability enhancers, and combinations thereof.

* * * * *